Patented Aug. 24, 1926.

1,596,990

UNITED STATES PATENT OFFICE.

ADOLPH NEHRING, OF CHICAGO, ILLINOIS, ASSIGNOR TO A. NEHRING & SONS CO., OF CHICAGO, ILLINOIS, A CORPORATION OF ILLINOIS.

PAINT AND VARNISH CLEANER.

No Drawing.   Application filed February 19, 1923.   Serial No. 620,037.

My invention relates to cleaning compounds, and more particularly to a cleaning compound for cleaning paint, varnish, enamel, or other surfaces with waterproof coating thereon.

It is a purpose of my invention to provide a cleaning powder for paint, varnish or enamel which is adapted to be mixed with water to provide a paste-like mixture which is adapted to be applied with a brush to the surface to be cleaned. After leaving the paste-like coating on the surface to be cleaned for a brief interval of time, the same may be washed off with water by means of a sponge or similar member and with the removal of said coating the dirt is removed from the painted, varnished or enameled surface. The cleaning compound comprises preferably a starchy material, such as corn flour or corn paste, an alkali cleaning agent, such as soda ash, and a gritty substance, such as pumice.

More particularly the invention comprises a mixture of corn paste or corn flour, soda ash and ground pumice, all of these being in a powdered form and being thoroughly mixed. It has been found that by using 74% corn paste or corn flour, 17% soda ash and 9% ground pumice the best results are obtained. While these proportions give the best results slight variations therefrom may be made without seriously affecting the efficiency of the cleaner, but any great variations from the percentages given would produce a compound which will not serve the purpose. The composition referred to above takes up moisture when exposed to the air due to the soda ash content thereof, and in the course of several months the percentage of soda ash due to the taking up of the mixture will be about 16% and the moisture content will be about 1%. Such a variation as the above does not have any undesirable effect on the action of the composition. The composition made up of the ingredients described above removes the dirt, smoke and soot from the painted, varnished, or enameled surface and also sticky substances without affecting the paint. If too much soda ash is used in the composition, the paint would be affected thereby, and also if too little soda ash were used, the proper cleansing action would not take place. The purpose of the corn flour is to produce a paste-like substance which can be applied to the painted surface with a brush and will remain in a moist condition after being placed thereon, so that the same can be readily removed with a wet sponge, after the same has been left on the surface for about two minutes, to remove the dirt therefrom without damaging or removing the paint or other coating material.

In use the dry powder containing the ingredients in the proportions mentioned above is mixed with water in the proportion of one gallon of water to one pound of the mixture, which makes the paste referred to above. The paste is then applied to the surface to be cleaned with a brush and after having been left on the surface for approximately two minutes the paste-like coating is washed off with a sponge and clean water thus removing the dirt from the surface to which the paste has been applied.

Having thus described my invention, what I desire to claim and secure by U. S. Letters Patent is:—

1. A composition of the character described comprising substantially three-fourths starchy substance, one-sixth soda ash and one-twelfth gritty material.

2. A composition of the character described comprising substantially three-fourths corn flour, one-sixth soda ash and one-twelfth ground pumice.

3. A composition of the character described comprising seventy-four to seventy-three percent corn flour, sixteen to seventeen percent soda ash and nine percent ground pumice.

4. A cleaner comprising substantially three-fourths corn flour, one-sixth soda ash and one-twelfth ground pumice mixed in dry form, and water in sufficient quantity to form a thin paste.

5. A cleaner comprising a powder containing substantially three-fourths corn flour, one-sixth soda ash and one-twelfth ground pumice, and water mixed in the proportions of substantially one pound of powder to one gallon of water to form a paste.

6. A composition of the character described comprising substantially one-sixth an alkaline carbonate and one-twelfth an abrasive in a relatively large quantity of a starchy substance, said composition comprising substantially three-fourths starchy substance.

In witness whereof, I hereunto subscribe my name this 10th day of February A. D., 1923.

ADOLPH NEHRING.